United States Patent [19]

Perry

[11] 4,205,106
[45] May 27, 1980

[54] DOORS

[75] Inventor: Donald J. Perry, Solihull, England

[73] Assignee: Perry Bros. (Hall Green) Limited, Birmingham, England

[21] Appl. No.: 902,337

[22] Filed: May 3, 1978

[30] Foreign Application Priority Data

Mar. 3, 1978 [GB] United Kingdom ............... 8649/78

[51] Int. Cl.² .................................................. B60J 5/04
[52] U.S. Cl. ..................................... 428/45; 296/146; 428/322; 52/309.11
[58] Field of Search ................ 52/810, 806, 807, 809, 52/785, 309.11, 455, 456, 457, 80, 81; 428/45, 71, 320, 321, 322; 49/504; 156/212, 196; 296/146

[56] References Cited

U.S. PATENT DOCUMENTS

| | | |
|---|---|---|
| 1,374,580 | 4/1921 | Kepley ................................. 52/573 |
| 3,058,550 | 10/1962 | Richter ................................. 52/80 |
| 3,349,525 | 10/1967 | Payne ................................... 52/80 |
| 3,629,046 | 12/1971 | Gilbert ................................ 428/71 |
| 3,697,633 | 10/1972 | Edgar ................................. 428/322 |
| 4,054,477 | 10/1977 | Curran ............................... 156/212 |
| 4,073,674 | 2/1978 | Hortel ............................... 428/322 |

Primary Examiner—John E. Murtagh
Attorney, Agent, or Firm—Marshall & Yeasting

[57] ABSTRACT

A light weight door for a caravan is made as a sandwich from two panels with an infilling of a wooden frame consisting of rails and stiles which are not jointed together, and with blocks of expanded polystyrene filling the spaces between the rails and stiles, these blocks being initially thicker than that of the wooden frame parts, and all of the parts being bonded together so that the blocks become compressed. The bonding makes the door concave convex at the latch edge but planar at the hinge edge. The door has rounded corners.

2 Claims, 11 Drawing Figures

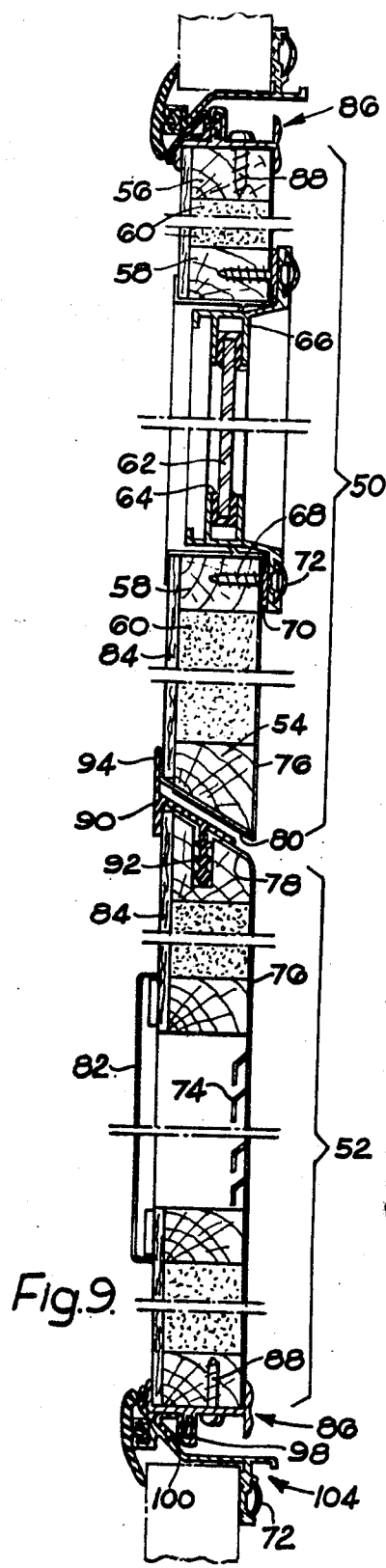
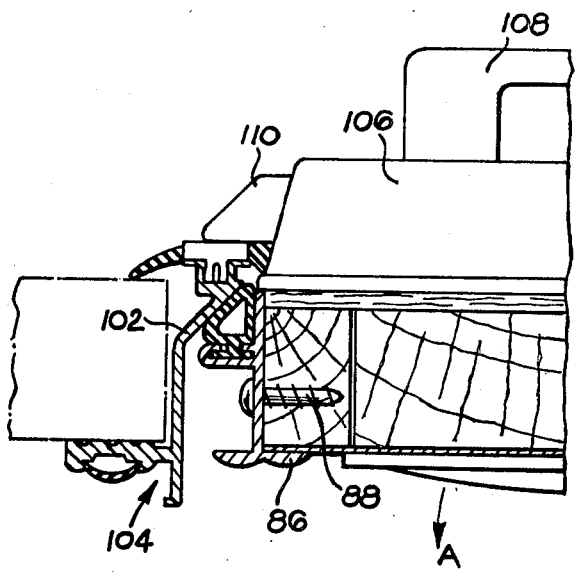
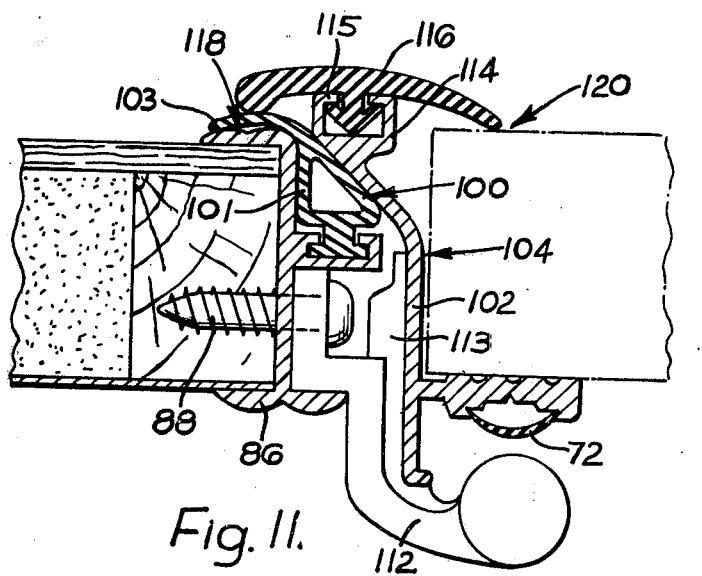

DOORS

This invention relates to doors particularly for use on caravans, cabin cruisers, portable buildings and similar applications where a relatively inexpensive and lightweight door is required. It is the object of the invention to provide such a door and moreover one which can be provided with at least one face which can be matched in appearance to that of the wall in which the door is to be mounted, thus minimising any subsequent finishing treatments required, and which can be readily made with either radiussed corners or top and/or bottom edges, which is required both for aesthetic purposes and in order to provide greater strength in the associated door frame without complicating the structure of the same; and finally to provide a door which has an improved resistance to sticking when in the closed position.

These and other objects of the invention will become more apparent from the following description with reference to the accompanying drawings, and the appended claims.

In accordance with a first aspect of the invention, a method of making a lightweight door comprises locating on a first planar panel a plurality of separate wooden edge parts to form an unconnected and unjointed frame, locating separate blocks of expanded plastics material between selected areas of said frame, said blocks having a thickness greater than that of the wooden edge parts, and locating a second planar panel on the assembly so formed, the frame and the panels being generally rectangular but with at least two adjacent corners of the rectangle radiussed, and bonding the whole assembly together so that the panels become bonded to opposite faces of both blocks and edge parts and so that the blocks are compressed in the direction of their thickness.

One of the panels may comprise hardboard and the other of the panels may comprise a piece of sheet metal where, for example, the door is to be used for a caravan, and the exterior of the caravan is formed of sheet metal which may be plastics coated, anodised, spray painted or otherwise treated, the sheet metal panel used for the door of the invention may be made of the same finished or treated material so that it will inherently match the caravan wall without subsequent treatment, and hence the sheet metal panel will form the exterior face of the door. Similarly, if the interior of the caravan is lined with hardboard as a wall material, and this is painted, papered or otherwise finished, the hardboard panel used in making the door may be treated in identical fashion, again so that no subsequent treatment is necessary. However, it is also intended to be within the scope of the invention to use two hardboard or like panels, or two sheet metal or like panels instead of one of each.

The edge parts may comprise rails and probably also stiles generally made of wood of square or rectangular cross section, and there are several possibilities for forming the radiussed corners. In one possibility the stiles which form the longitudinal side edges of the door at this stage of the assembly and which may be generally straight will have square cut ends, and two of the rails, which are to form the top and bottom edges of the door at this stage of the assembly and which are also generally straight will have radiussed ends (or vice versa). By radiussed ends it is meant that when these rails are placed flat upon the one panel, their adjacent faces extending normally of the panel will be planar so that the end portion of these faces can abut approximately against the square cut ends of the stiles, but the two faces which are remote from each other will have generally curved ends which sweep in a smooth arc from the outer faces of the stiles to merge into the parallel portions of the outer faces of these rails.

A second method of providing the radiussed corners is to use generally straight stiles and rails with square cut ends, but which are spaced apart at the "corners" of the panel, with a corner block located at each corner which is to be radiussed, the corner blocks having for example two faces which meet at a right angle towards the interior of the door and which are joined by a smooth curve forming the external "corner".

A third method, when the whole of the top (or bottom, or both) is to be radiussed is to use a pre-formed curved rail or rails.

In general, either the two top corners of the door (in use) will be radiussed (including the possibility of the two radii having a common locus) or all four corners of the door will be radiussed or so radiussed.

The stiles, rails and corner blocks if used, are to form an unconnected and unjointed frame. That is to say these wooden components are to be placed together so that they approximately abut, but without any mortice and tenon or other joint formed between the parts, and without any brackets or connecting plates. The importance of this is so that in the event of any warping arising in any one wooden component, this will not be transmitted around the frame by joints and will have minimum effect on the planarity of the door.

The wooden frame may also include additional components, generally in the form of rails in the sense that they are to extend transversely of the door, although possibly in the form of additional vertically extending components, particularly so that any desired aperture in the door per se which is to be filled by a window, ventilator or the like, will be generally surrounded by a peripheral sub-frame of wood, again in the unjointed and unconnected form.

In general, each cavity formed between several of the wooden components, other than those where windows or ventilators are to be fitted, will be used to locate a correspondingly shaped block of expanded plastics material, which may be polystyrene, polyurethane or the like. Each material is inherently weak and fragile, but given substantial strength and rigidity to the assembled door when bonded in place over the whole of the face area of the blocks and when subject to small compression inherent through the use of blocks which are of greater thickness than the wooden components.

One of the cavities between the wooden members may be used to locate a slab of denser material, for example chipboard, particularly where a door lock is to be assembled and where the chipboard can serve to receive the necessary wood screws. Since the chipboard is less compressible, than the plastics material, it will be of the same thickness as the other wooden components.

Prior to making the assembly, the panels are coated with an appropriate bonding adhesive, which may be one which is non-tacky to the touch, and which requires to be pressure bonded, and the wooden components, the plastics slabs, and the chipboard if used are coated with the same adhesive on both faces. The assembly of wooden components, plastics slabs, and chipboard if used is then arranged in appropriate fashion on one panel, and the second panel is superimposed.

It is preferred to effect the bonding operation between matched dies and it has been found in practice that this can be done with a stack of assemblies, for example with ten doors one above the other located between the upper and lower dies of a press.

The matched dies may additionally effect shaping of the doors so that they are not truly planar, the curvature imparted by the dies may be slight but complex: each door may be truly planar at one of the longitudinal edges which is intended to be provided with hinges, and concave/convex at the opposite longitudinal edge. The concavity will be on the internal face of the door (in use) and the convexity on the external face, and this may be of the order of say $\frac{3}{4}"$, $\frac{1}{2}"$ or 1 cm out of planarity at each of the top and bottom of a normal 6' or 2 meter or thereabouts, high door. The effect of this will be that when the door is closed, assuming that it opens outwards from the for example caravan, the top and bottom corners of the door will register with the door frame initially and continued closing movement by a handle located approximately mid-way up the height of the door will tend to take the door latch into engagement with a keeper provided on the door frame and to flatten the door inwards towards true planarity. This flattening operation will also increase the vertical height of the door at the front edge so that it tends to fill the door frame more completely. In opening, when the handle is operated to release the latch from the keeper, the door will tend to return to the concave/convex shape thus reducing the overall height of the door and freeing the top and bottom corners from the frame, thus avoiding problems with the door sticking to the frame, which problems are particularly prevalent with lightweight doors fitted to structures which are not entirely rigid.

When the door has been removed from the matched dies after having effectively set in the required position due to the operation of the bonding adhesives, the whole of the periphery of the door may be enclosed in an extruded metal channel section which extends for example from a mid-point at the bottom of the door around the whole of the periphery and with the ends of the extrusion abutted. The extrusion can be held to the wooden frame at a small number of selected points for example by wood screws, and the extrusion also serves to mount draught excluder seals, hinges and other door furniture.

The use of radiussed corners on the door enables the door to be used in association with a door frame which is similarly made of a length of extruded metal section of appropriate cross sectional shape, and which can be curved or bent to form the complete door frame, instead of using a plurality of separate pieces jointed at the corners (because the complex and usually extruded section used cannot be folded to a right angle). This greatly simplifies the construction of the door frame whilst making it very much more rigid.

The invention is now more particularly described and illustrated with reference to the accompanying drawings wherein:

FIG. 9 is a sectional elevation of a practical embodiment and

FIGS. 10 and 11 are transverse sections of the door of FIG. 9.

Figure 1:
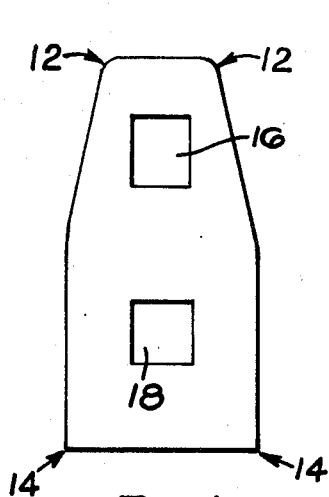
FIG. 1 is a somewhat diagrammatic elevation of a door.

Turning now to the accompanying drawings and particularly FIG. 1 thereof, the door shown therein is a typical caravan door having upper radiussed corners 12 and lower square corners 14. The side edges of the door are not truly parallel as there is some shaping to give a slight convergence of the side edges towards the top. The door is provided with a window diagrammatically indicated by the reference 16 and a ventilator shown by the reference 18.

Figure 2:
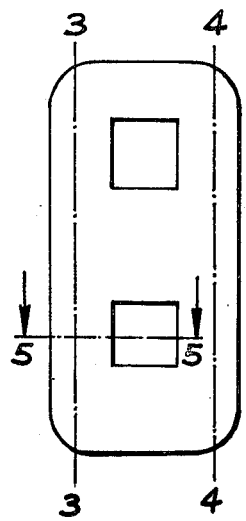
FIG. 2 is a similar diagrammatic elevation of a second door.

The door shown in FIG. 2 is generally similar to that in FIG. 1, except for the purposes of illustrating other possibilities it is shown as having parallel side edges and radiussed corners at all four corners of the generally rectangular shape.

Figure 3:
FIG. 3 is a section taken on the line 3—3 of FIG. 2.
Figure 4:
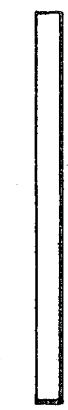
FIG. 4 is a section taken on the line 4—4 of FIG. 2.

FIGS. 3 and 4 show the shaping of the door previously referred to, so that in FIG. 3 the concave-convex shape is seen, and in the chain-dot line this Figure illustrates the slight deformation which takes place when the door is closed and latched. The curvature has been substantially exaggerated in FIG. 3 for the purposes of illustration.

Figure 5:
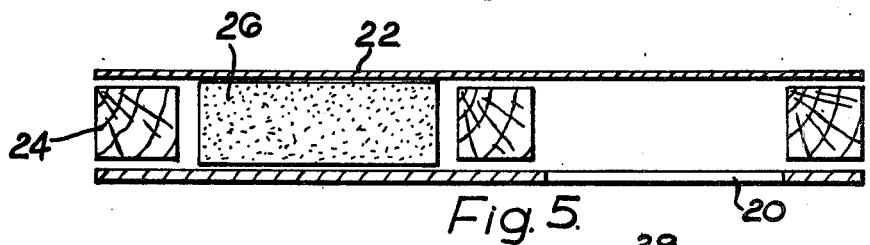
FIG. 5 is a section on the line 5—5 of FIG. 2.

FIG. 5 shows a typical cross section of an assembly prior to the bonding stage, including a thick panel for example of hardboard shown by the reference numeral 20 assembled with a thin panel for example of sheet metal shown by the reference numeral 22 and sandwiched between the two a number of wooden stiles or rails 24 and a number of thicker blocks of expanded plastics material 26.

Figure 6:
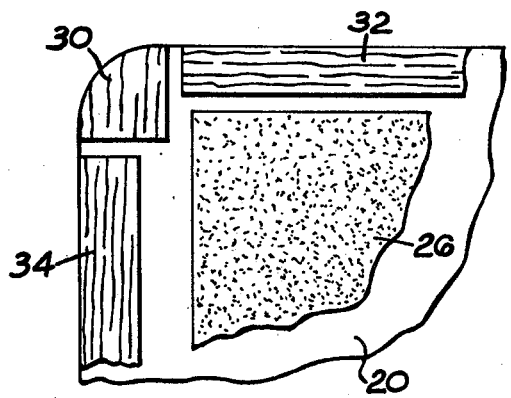
FIG. 6 is an enlarged fragmentary and diagrammatic view showing a portion of an assembly partway through manufacture of the door.
Figure 7:
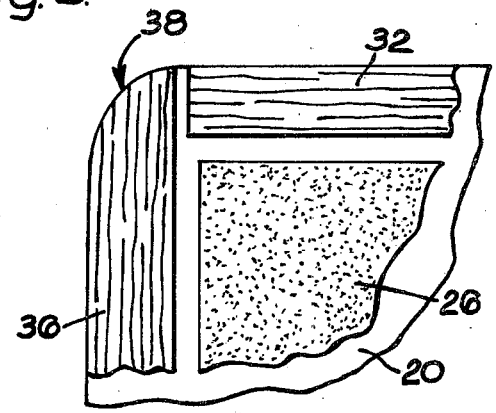
FIG. 7 is a view similar to FIG. 6 showing an alternative.

FIGS. 6 and 7 show two of the alternative possibilities at the corners, FIG. 6 showing the arrangement with a corner block located between a stile 32 and a rail 34, and FIG. 7 showing the rail 36 substantially abutting against the stile 32 but with the end portion of the rail being radiussed at 38. It will be noted that in both cases the panel is generally shaped to the radii required prior to assembly, and in both cases the actual clearances are exaggerated.

Figure 8:
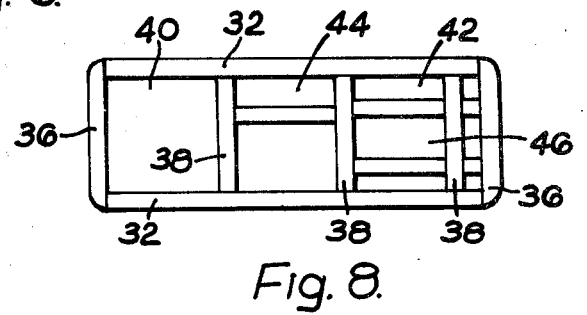
FIG. 8 is a further diagrammatic view showing the arrangement of parts in a part assembled door.

FIG. 8 shows a typical arrangement of parts on one panel, prior to locating a second panel in place and press bonding the complete door, including a pair of stiles 32 located at the opposite longitudinal edges of the door, a pair of rails 36 located at the top and bottom of the door, a series of transverse rails, which serve with the other rails and stiles to define a series of cavities, ones of which such as 40 42 are approximately filled with blocks of expanded plastics material, a further one of which 44 locates a block of chipboard for securing a lock, and another of which 46 is to define the general area of a window or the like aperture.

Turning now to FIGS. 9 and 11, which are different sections through a typical door in accordance with the invention, it will be seen that this is made in two parts, comprising an upper portion shown by the reference numeral 50 and a lower portion 52, these being arranged so that the upper portion can be opened alone (for maximum ventilation) or the two portions can be opened together. Such a door is sometimes called a "stable door". The two portions can be collectively assembled and manufactured completely as a single unit, prior to the addition of the extruded metal sections around the peripheries of the respective parts.

The upper part comprises wooden rails 54 56, additional transversely extending wooden rails 58, blocks of the plastics foamed material 60, a window unit comprising a glass pane 62 assembled in a rubber or like plastics sealing ring 64 within an extruded metal frame 66 which is fixed in place by screws 68 with an interposed gasket 70, and with the heads of the screws hidden by a snap-in plastics strip 72 engaged in a dovetail channel provided for the purpose in the extrusion. It will be noted that the screws here go directly into the wood.

In an alternative (not shown) the window is double glazed. In either case the frame may be of plastics or rubber, with or without a metal frame.

In the case of the lower portion, a ventilator is provided with louvres 74 formed in to the sheet metal panel 76 which covers the exterior face of the door, and here a portion of the panel 76 is bent at 78 in the case of the lower part of the door and at 80 in the case of the upper part of the door to extend over the adjacent edge parts of the two door portions.

The ventilator is completed by an assembly 82 fixed to the hardboard or like (for example plywood) panel 84 which forms the inner skin of the door, that is the face adjacent the interior of the portable building or the like where the door is used.

The longitudinal edges of the door and also the top and bottom are enclosed in channels of extruded metal, each of which is of generally U shape, with the limbs of the U embracing the side edges, these extrusions being generally indicated by the reference numeral 86. These extrusions are held in place by further screws 28 which engage in the rails and stiles respectively as seen in FIGS. 9, 10 and 11.

The upper edge of the lower door portion is provided with an additional extrusion 90 which is formed with an integral ribbed flange 92 of "barbed arrow" cross-section so as to be a press-fit into a slot provided for the purpose in the rail at that edge of the door portion, and this extrusion also has an additional flange 94 which forms am abutment for the upper portion of the door when the two portions are generally co-planar.

It will be appreciated that in this arrangement of a split door, two separate latches are provided, and FIG. 10 shows a typical transverse cross section clear of either of the latches. It will be noted that the extrusion 86 is formed with a hollow box-like flange 98 to anchor a rubber or like plastics sealing strip generally indicated at 100 which includes a portion of hollow box-like section 101 which can be compressed and deformed between the extrusion 86 and a co-operating inclined portion 102 of the door frame extrusion 104. The rubber or like strip 100 includes a flap 103 to seat on the door as a draught-excluding seal. The strip 100 extends around the whole of the door. The extrusion 104 has a similar dovetail channel and sealing strip 72 as used in the case of the window frame, to enable the door frame to be secured to the surrounding structure by wood screws, and the heads of the screws to be hidden.

The typical latch construction 106 includes a conventional pivoted lever handle 108 and a latch belt 110.

FIG. 10 shows the latch side of the door, and FIG. 11 shows the hinge side, the hinge comprising leaves 112 113 fixed respectively to the extrusion 86 which is fixed to the door and to the door frame 102. It will be noted that the door frame includes the channel 114 extending along its length, which has inturned edges 115 used to anchor a flexible strip 116 along the hinge edge of the door, and which can seat on the flap 103 at 118 and on the adjacent edge of the wall at 120 as a secondary draught excluder, and similarly at the latch edge of the door. It will be appreciated that in FIG. 10, the door opens in the direction of the arrow A. The strip 116 has a portion of "arrow head" cross section which can be pushed into the box-section 114 and recover to hold the strip in position.

I claim:

1. A method of making a light weight door comprising locating on a first planar panel a plurality of separate wooden edge parts to form an unconnected and unjointed frame, locating separate blocks of expanded plastics material between selected areas of said frame, said blocks having a thickness greater than that of the wooden edge parts, and locating a second planar panel on the assembly so formed, the frame and the panels being generally rectangular but with at least two adjacent corners of the rectangle radiussed, and bonding the whole assembly together so that the panels become bonded to opposite faces of both blocks and edge parts and so that the blocks are compressed in the direction of their thickness, the bonding being effected between matched dies to impart curvature to each door so that the door is planar at a hinge edge and concave/convex at the opposite longitudinal edge.

2. A light weight door comprising a pair of generally planar panels with a wooden frame located between the panels, wherein the wooden frame comprises stiles and rails which are not jointed together, and the frame and panels provide at least two radiussed corners to the door, wherein blocks of expanded plastics material are located between selected ones of the stiles and rails, said blocks being compressed in the direction of the thickness of the door, and all of the parts being bonded together, the door being planar at a hinge edge and concave/convex at the opposite parallel edge.

* * * * *